United States Patent [19]

Kafri et al.

[11] Patent Number: 4,776,013
[45] Date of Patent: Oct. 4, 1988

[54] METHOD AND APPARATUS OF ENCRYPTION OF OPTICAL IMAGES

[75] Inventors: Oded Kafri, Beersheba; Eliezer Keren, Arad, both of Israel

[73] Assignee: Rotlex Optics Ltd., Beersheba, Israel

[21] Appl. No.: 32,820

[22] Filed: Apr. 1, 1987

[30] Foreign Application Priority Data

Apr. 18, 1986 [IL] Israel ................................ 78541

[51] Int. Cl.⁴ ........................................... H04L 9/00
[52] U.S. Cl. ................................. 380/54; 380/10; 380/20
[58] Field of Search ............................ 380/54, 10, 20

[56] References Cited

U.S. PATENT DOCUMENTS

| | | | |
|---|---|---|---|
| 2,495,790 | 1/1950 | Valensi | 380/54 |
| 2,952,080 | 9/1960 | Avakian et al. | 380/54 |
| 3,156,051 | 11/1964 | Hughes et al. | 380/54 |
| 3,234,663 | 2/1966 | Ferris et al. | 380/54 |
| 3,627,919 | 12/1971 | Roth et al. | 380/54 |
| 3,889,056 | 6/1975 | Mayer, Jr. et al. | 380/54 |
| 3,914,877 | 10/1975 | Hines | 380/54 |
| 4,586,711 | 5/1986 | Winters et al. | 380/54 |
| 4,682,954 | 7/1987 | Cook | 380/54 |

*Primary Examiner*—Salvatore Cangialosi
*Attorney, Agent, or Firm*—Benjamin J. Barish

[57] ABSTRACT

A method of encoding an optical image comprises: converting the optical iamge to an image grid comprised of an image matrix of pixels each having at least two possible intensity values; providing a master grid comprised of a master matrix of pixels each having at least two possible intensity values; and transmitting, for each pixel location of the image matrix, a pixel intensity value representing the intensity value of the master matrix at the corresponding location, its complement, or a random intensity value, depending on the intensity value of the pixel in the image matrix at the corresponding location. Also described is an apparatus for carrying out the above encoding method.

19 Claims, 6 Drawing Sheets

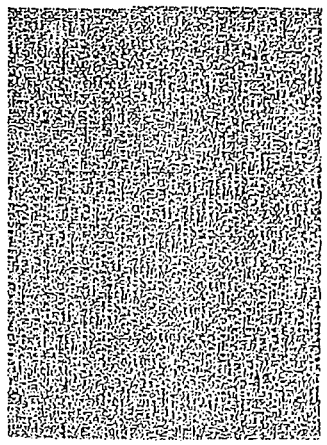
FIG. 4A (MASTER GRID)
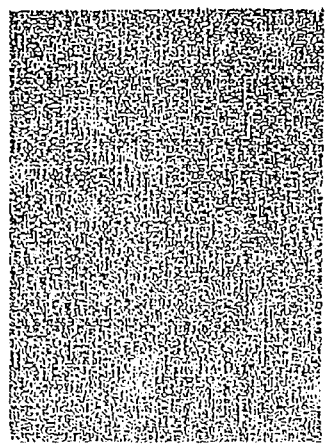
FIG. 4B (ENCODED GRID)
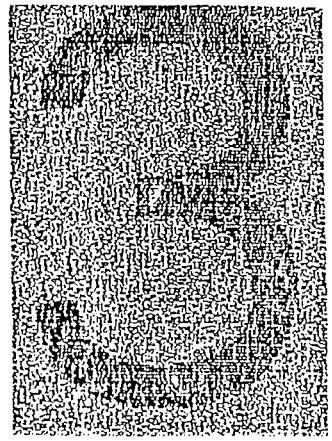
FIG. 4C (DECODED PICTURE)

4,776,013

METHOD AND APPARATUS OF ENCRYPTION OF OPTICAL IMAGES

BACKGROUND OF THE INVENTION

The present invention relates to a method and apparatus for encoding and encrypting optical images, such as two-dimensional patterns and shapes.

The encoding of two-dimensional patterns and shapes is important for transmission of pictures and for similar purposes in civilian security as well as military applications. Many techniques have been proposed and are now in use, but efforts are continuously being made to increase the difficulty in deciphering the transmission by an unauthorized person.

An object of the present invention is to provide a method and apparatus for encoding and encrypting optical images in a manner extremely difficult to decipher by an unauthorized person.

BRIEF SUMMARY OF THE INVENTION

According to the present invention, there is provided a method of encoding an optical image comprising: converting the optical image to an image grid comprised of an image matrix of pixels each having at least two possible intensity values (sometimes called "brightness" or "grey-level") values; providing a master grid comprised of a master matrix of pixels each having at least two possible intensity values; and transmitting, for each pixel location of the image matrix, a pixel intensity value representing the intensity value of the master matrix at the corresponding location, its complement, or a random intensity value, depending on the intensity value of the pixel in the image matrix at the corresponding location.

It will thus be seen that the novel method is based on the use of random grids. An important property of random grids is the principle of "combination". That is, if a section is cut-out from a random grid and is replaced with a section of similar shape from a second random grid, the result is yet another random grid. The number of different grids possible is in the order of $2^N$, where, "N" is the number of pixels in the array.

When two random grids with the same dimensions are placed on top of one another so that they correspond pixel by pixel, and when each pixel can have but two possible intensity values (e.g. "1"=transparent, and "0"=opaque), the probability of each superimposed pixel being transparent is $\frac{1}{4}$. Thus, the average transmission of two superimposed different random grids is $\frac{1}{4}$. When the two grids are identical, the average transmission is $\frac{1}{2}$.

Several embodiments of the invention are described below for purposes of example. In one embodiment, the master pixel is transmitted when the image pixel is of one intensity value (e.g. "1" indicating "white"), and the complement of the master pixel intensity value is transmitted when the image pixel is of the other intensity value ("0" indicating "black"); in a second described embodiment, the master pixel is transmitted when the image pixel is "1", as in the first embodiment, but a random pixel is transmitted when the image pixel is "0"; and in a third described embodiment, a random pixel is transmitted when the image pixel is "1", and the complement of the master pixel is transmitted when the image pixel is "0".

A fourth embodiment of the invention is described wherein each pixel is of three grey levels, namely "1" representing white, "$\frac{1}{2}$" representing grey, and "0" representing black. In this described embodiment, the master pixel is transmitted if the image pixel is "1", a random pixel is transmitted if the image pixel is "$\frac{1}{2}$", and the complement of the master pixel is transmitted if the image pixel is "0".

Since in all the above-described embodiments, the encoded grid is a combination of two or more random grids, the encoded grid itself is also a random grid; therefore, by itself, it does not convey any information about the encoded picture. This makes it very difficult to decipher by an unauthorized person not having the master grid. As will also be described below, the method can be extended to the encryption of pictures with more than three grey levels, thereby further increasing the difficulty of deciphering without the master grid.

The invention also provides apparatus for encoding and for encryption in accordance with the above-described method.

BRIEF DESCRIPTION OF THE DRAWINGS

The invention will be better understood by reference to the enclosed drawings, wherein:

FIGS. 4a–4c illustrate, respectively, the master grid, the encoded grid, and the decoded image, when encrypting the optical image of the number "3" in accordance with the embodiment of the invention represented by the flow diagram of FIG. 3;

DESCRIPTION OF PREFERRED EMBODIMENTS

Figure 1:
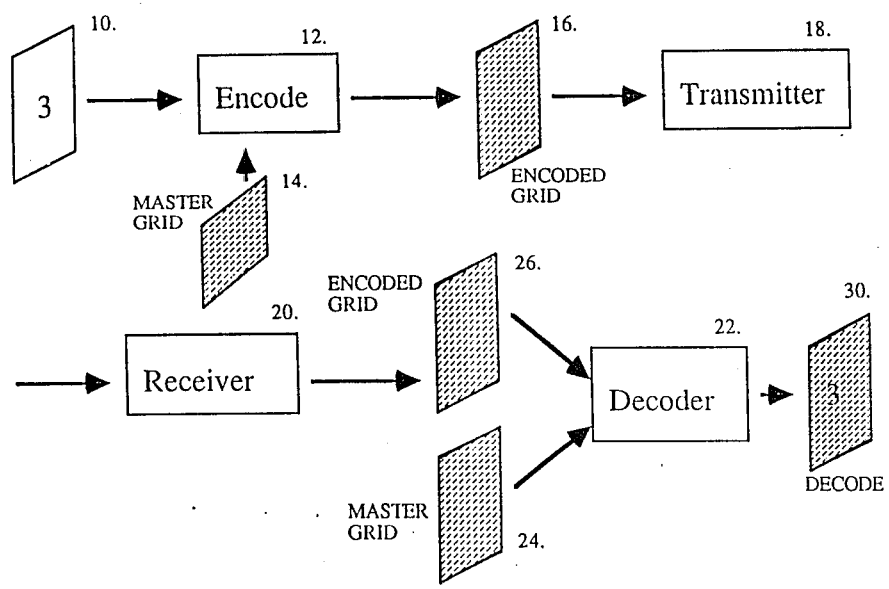
FIG. 1 is a block diagram illustrating the main steps in a method of encrypting an optical image in accordance with the present invention.

Reference is first made to FIG. 1 illustrating the basic concept of the method of encryption in accordance with the present invention. Thus, as shown in FIG. 1, the optical image 10 to be transmitted, representing the number "3", is encoded in an encoder 12 with a master grid 14 to produce an encoded grid 16 which is transmitted via transmitter 18 to a receiver 20. The receiver 20 includes a decoder 22 which receives the encoded grid 26, corresponding to the transmitted encoded grid 16, and also the master grid 24, corresponding to the master grid 14 in the transmitter, to produce the decoded grid 30, which is a reproduction of the optical image 10 originaly transmitted.

The encoding operation 12 in the transmitter end, and the decoding operation 22 in the receiver end, may be performed according to any one of a number of algorithms as described below particularly with reference to FIGS. 3, 5, 6 and 7, respectively. In all these algorithms, the optical image 10 is converted to an image grid composed of an image matrix of pixels each having at least two possible intensity values ("1" and "0" in the algorithms of FIGS. 3, 5 and 6; and "1", "½", and "0" in the algorithm of FIG. 7); and there is transmitted, for each pixel location of the image matrix, a pixel intensity value representing the intensity value of the master grid (14, 24) at the corresponding location, its complement, or a random intensity value, depending on the intensity value of the pixel in the image matrix of the corresponding location. Since the encoded grid which is transmitted (grid 16 in FIG. 1) thus constitutes a combination of two random grids, the encoded grid itself is a random grid, and therefore, by itself, does not convey any information about the encoded grid. This makes deciphering of the encoded grid extremely difficult by an unauthorized person not having the master grid.

The master grid 14 may be generated by scanning a master image and converting it to a master matrix of pixels each having the same two (or three, or more) possible intensity values as the optical image. Preferably, the master grids 14 and 24 are in the form of a ROM (Read Only Memory) storing the master matrix of pixels and used in the above-described encoding step 12 and decoding step 22, respectively; alternatively, the master grid used in the decoding could be in the form of a transparency superimposed over the encoded image.

Figure 2:
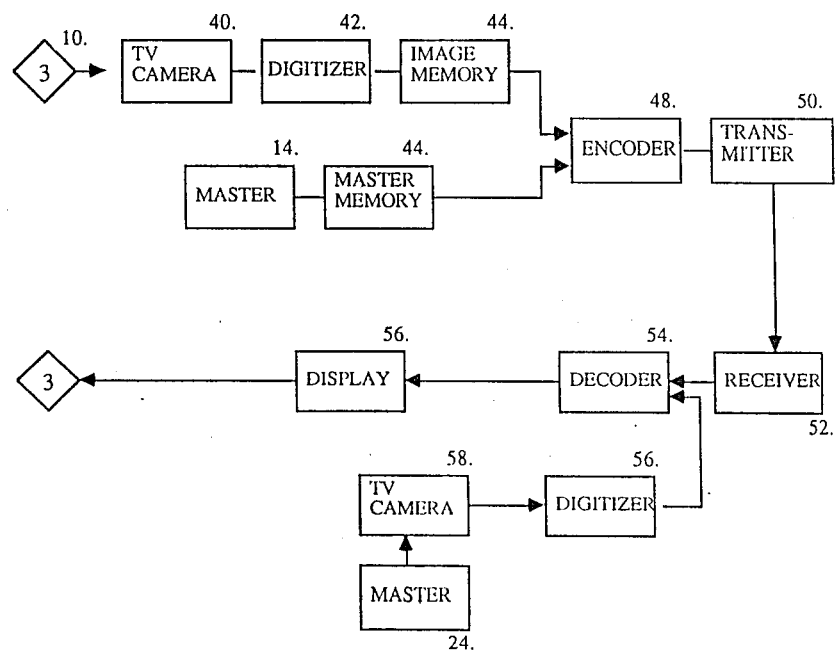
FIG. 2 is a block diagram illustrating the main components of a system for encrypting an optical image in accordance with the present invention.

FIG. 2 is a block diagram illustrating one implementation of the encryption method described above with respect to FIG. 1.

Thus, the optical image 10 to be encoded is scanned by a TV camera 40, converted by a digitizer 42 to an image grid composed of an image matrix of pixels in which matrix each pixel may have two intensity values, namely "1" for "white", and "0" for "black", and stored in an image memory 44. The master grid 14 composed of a master matrix in which each pixel may have the same two values as in the image matrix, was previously stored in a memory 44. Each pixel of the image matrix from the image memory 44 is introduced into encoder 48 with the correspondingly-located pixel of the master matrix from the master memory 46.

Encoder 48 utilizes both the image matrix and master matrix to produce an encoded grid (16, FIG. 1) according to the specific algorithm selected for encryption, as described below with rexpect to FIGS. 3, 5 and 6. The encoded grid is then transmitted by transmitter 50, and is received by receiver 52. The master grid, if stored in memory, is used in the decoding; but if in the form of a transparency, it is superimposed over the encoded grid in decoder 54, to produce the decoded grid which is displayed in a display unit 56.

Figure 3:
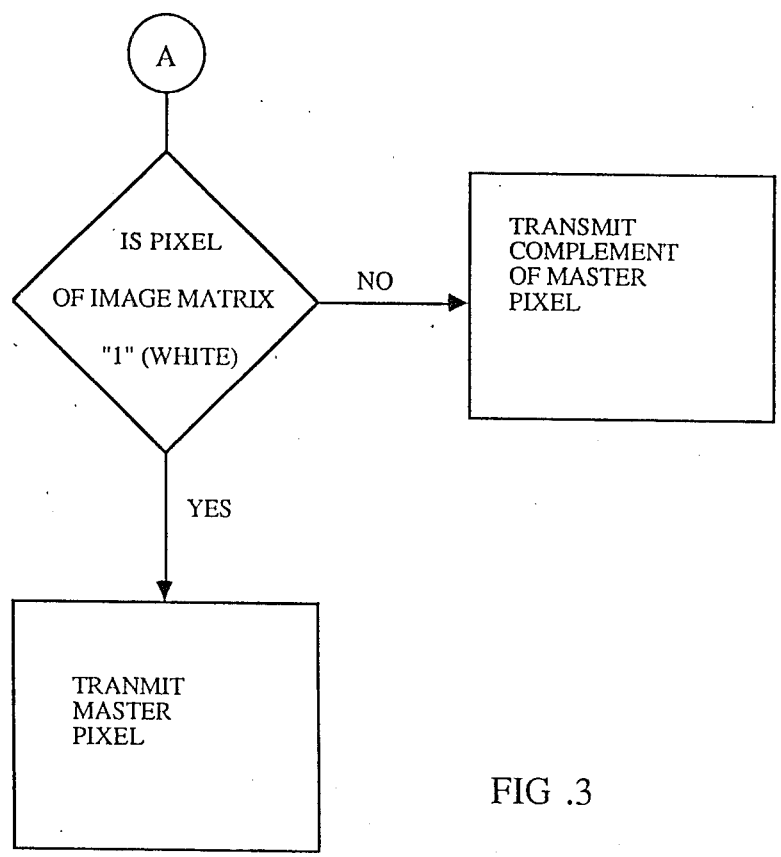
FIG. 3 is a flow diagram illustrating the operation of the encoder in the system of FIG. 2 for encrypting an optical image in accordance with one embodiment of the invention.

FIG. 3 is a flow diagram illustrating one algorithm which may be used for operation of the encoder 48, and also the decoder 54, in the system illustrated in FIG. 2. The algorithm illustrated in FIG. 3 is for use when each pixel of the image matrix and master matrix has only two possible intensity values, in this case a "1" when the pixel is white, and a "0" when the pixel is black.

Thus, as shown by the algorithm illustrated in FIG. 3, each pixel of the image matrix inputted into the encoder 48 is examined to determine whether it is "1": if so, the encoder 48 outputs to the transmitter 50 the master pixel at the corresponding location of the matrix; if not, encoder 48 outputs to the transmitter the complement of the master pixel at the corresponding location of the matrix.

As described above with respect to FIG. 2, the encoded grid received by the receiver 52 is decoded in decoder 54, by the use of a computer-stored or an optically-transparent master matrix, to produce the decoded picture displayed in diplay 56.

FIG. 4a illustrates the master grid which, as indicated above, is a random grid; FIG. 4b illustrates the encoded grid outputted from encoder 48 and inputted into decoder 54 using the master grid of FIG. 4a and the picture 10 encrypted by the sytem; and FIG. 4c illustrates the decoded picture outputted from decoder 54 and displayed in display 56. It will thus be seen that, in the decoded picture of FIG. 4c, the black pixels of the original image 10 are reproduced as black (pixel intensity value equal "0"), whereas the white pixels in the original image are reproduced as "grey" (pixel intensity value equal "½").

Since the encoded grid of FIG. 4b is a combination or superposition of two random grids, (namely, the master grid and the complement of the master grid), the encoded grid itself is a random grid and therefore does not convey any information about the encoded picture, thereby making deciphering of the encoded picture extremely difficult.

Figure 5:
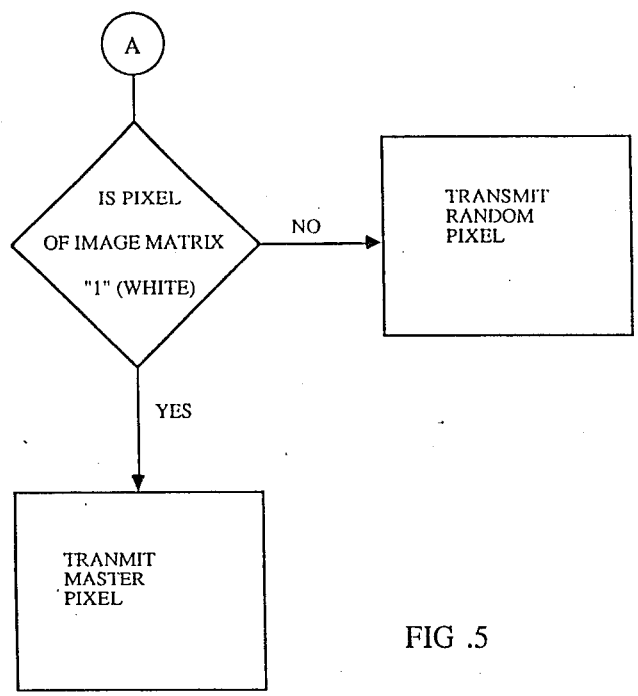
FIGS. 5, 6 and 7 are flow diagrams illustrating three additional methods of encoding the transmitted optical image, and thereby decoding of the transmitted optical image, in accordance with three further embodiments of the invention.

FIG. 5 illustrates a second algorithm which may be used for operation of encoder 48 and decoder 54 in the system of FIG. 2, wherein each pixel of the image matrix and master matrix also has two grey levels, namely "1" representing white, and a "0" representing black. Thus, when the encoder and decoder are operated according to the algorithm illustrated in FIG. 5, the encoder 48 transmits the master pixel intensity value when the image pixel at the corresponding location is "1" (white), and a random pixel intensity value when the image pixel at the corresponding location is "0" (black). The same master grid is used in decoder 54 for decoding the so-encrypted picture. The encoded picture produced according to this algorithm is even more difficult to decipher than the algorithm of FIG. 3, since some regions of the encoded grid bear no relationship to other pictures encoded from the same master; however, the contrast is poorer than when using the algorithm of FIG. 3.

Figure 6:
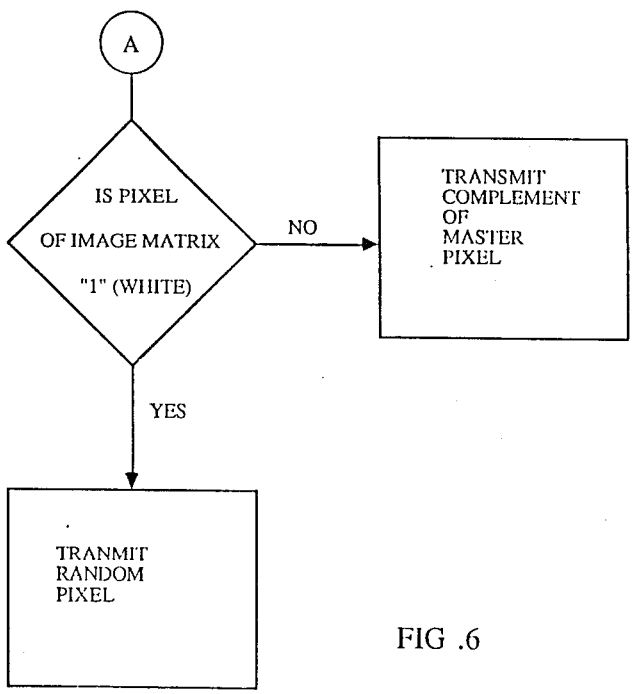

FIG. 6 illustrates a further algorithm that may be used for operating the encoder 48 and decoder 54 in the system of FIG. 2, also in the case where each pixel intensity value is of one of two grey levels, namely a "1" representing white, and a "0" representing black. According to the algorithm of FIG. 6, the encoder 48 transmits a random intensity value when the image pixel intensity value at the correponding location of the matrix is "1" (white), and the complement of the master pixel when the image intensity value at the corresponding location of the matrix is "0" (black). The encoded grid according to the algorithm illustrated in FIG. 6 is as difficult to decipher as the algorithm illustrated in FIG. 5, but the final picture has improved contrast over the algorithm illustrated in FIG. 5 because "black" is reproduced as "black"; however, the contrast is poorer than with the algorithm illustrated in FIG. 3.

Figure 7:
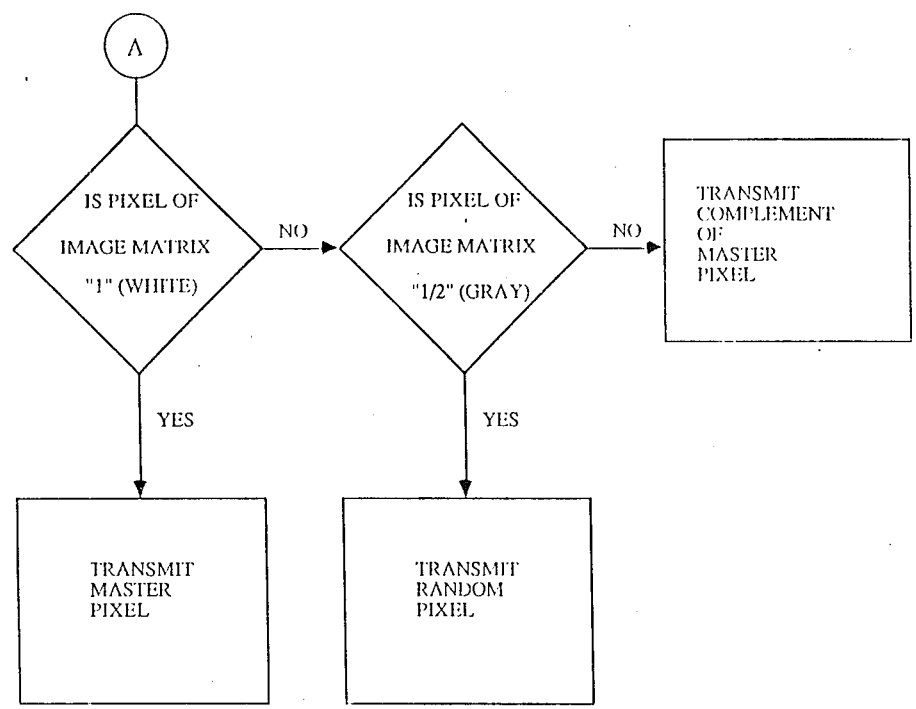

FIG. 7 illustrates a still further algorithm which may be used for operating the encoder 48 and decoder 54 in the systm of FIG. 2. The algorithm illustrated in FIG. 7 requires that each pixel be of one of three grey levels, namely "1" representing white, "½" representing grey, and "0" representing black.

According to the algorithm illustrated in FIG. 7, encoder 48 transmits the intensity value of the master pixel where the image pixel is "1" at the corresponding location of the matrix, a random pixel where the image pixel at the corresponding location is "½", and the complement of the master pixel where the image pixel at the corresponding location is "0". Encryption according to the algorithm illustrated in FIG. 7 is even more difficult to decipher than the method illustrated by the algorithms of FIGS. 3, 5 and 6.

The method can be extended to the encryption of pictures with more than 3 grey levels.

Thus, let the picture with $N = n \times m$ pixels have $K+1$ distinct levels of grey with intensity values $0, 1, \ldots K$. In order to encode this picture an imaging system is needed having a higher spatial resolution, say $N_1 = n_1 \times m_1$ pixels, with $N_1 > N$. To each pixel in the picture there is assigned a rectangular array of $M = (n_1/n) \times (m_1/m)$ pixels in the image frame. This array of M pixels is referred to as a "superpixel". The relationship between the number of grey levels and the required superpixel dimensionality will be calculated as follows:

The encoder and master random grids have identical numbers of superpixels and pixels and the same subdivision of superpixels into pixel arrays. Each pixel in the encoded grid corresponds to one pixel in the master, with the same coordinates. Three choices are available for determining the light transmission by each pixel in the encoded grid:

(1) duplicate the corresponding pixel in the master grid, which leads to an average transmission of ½ in the superimposed grids;

(2) complement the master, which yields zero transmission; or (3) choose randomly, which results in an average transmission of ¼.

Various combinations of the three assignments produce intermediate levels of grey according to the following procedure.

Let I be the number of duplicated pixels out of the M pixels of a particular superpixel in the master. The number of complemented pixels is J; the remaining $L = M - I - J$ are chosen at random. The resulting average transmission is:

$$T = I/(2M) + L/(4M) + 0(J),$$

$$T = (I-J)/4M + \tfrac{1}{4} \quad (1)$$

$$0 < I, J, L < M \quad (2)$$

From eqs. 1, 2 "T" ranges from 0 to ½ in steps of $1/(4M)$, so there are overall $2M+1$ distinct transmission values, namely $K = 2M$.

The superpixel in a picture with intensity (brightness) values g in the range 0–K will be assigned according to $$T = g/2K \quad (3)$$

The choice of I and J for each superpixel must satisfy inequality (2) and (See eq. 1):

$$I - J = (4T - 1)M = g - M \quad (4)$$

Unless g equals "0" or "K" the choice of I and J is not unique. In order to maximize the randomness of the coding mechanism, it is preferable to choose $J = 0$ for $g \leq K/2$ and $I \leq 0$ for $g \geq K/2$. Alternatively, it is possible to choose the values of I and J at random, subject to the constraints of eqs. 2 and 4.

The assignment of individual pixels within the array to the three coding alternatives is also done at random. This further reduces the correlation between different superpixels in the coded grid.

Although the average transmission of random grids is ¼, the transmissions of individual superpixels may differ from ¼, due to the random choice and the small size of the pixel array. The width of the distribution of superpixel transmissions, which is centered around ¼, is inversely proportional to the square root of the number M of pixels in each superpixel. When the master and encoded grids are superimposed, the resulting transmission may be slightly different from that expected from eq. 3. This variation cancels out when averaged over many neighboring superpixels, and produces in effect, dithering. Dithering is a technique often used for smoothing out artificial contours formed at the transition between different levels in a picture with a limited number of grey levels. This is attained through deliberate addition of a random noise to the picture, producing a result that is more pleasing to the eye. This beneficial effect results automatically from the proposed method and has the added advantage of making deciphering more difficult.

Figure 8:
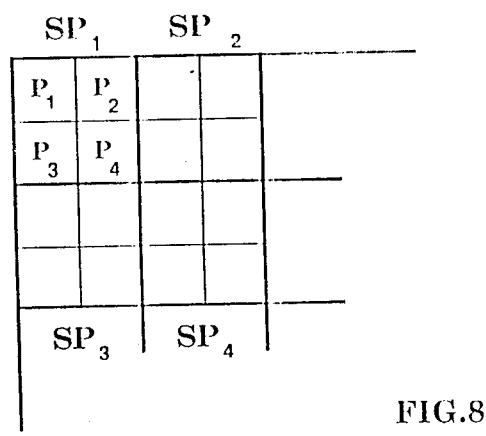
FIG. 8 diagrammatically illustrates a "superpixel" involved when extending the encryption of pictures to more than three grey levels.

FIG. 8 illustrates several such "superpixels" $SP_1$, $SP_2$, $SP_3$, each constituted of a matrix of $2 \times 2$ regular pixels (e.g. $P_1 - P_4$) thereby providing nine grey levels.

Figure 9:
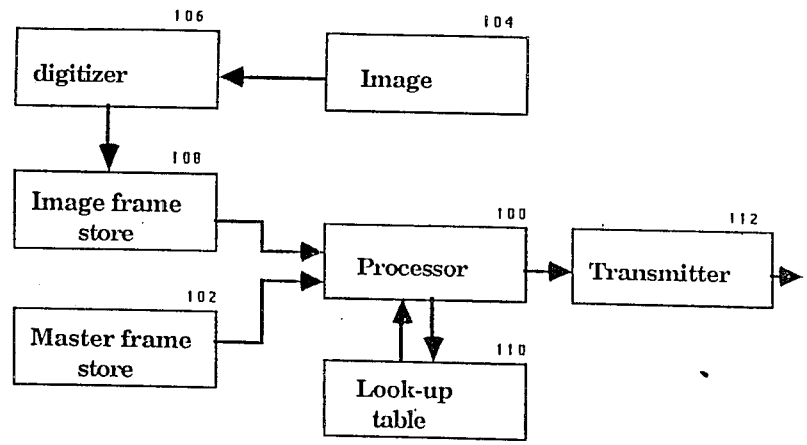
FIG. 9 is a block diagram illustrating the apparatus when encrypting according to the "superpixel" variation.
Figure 10:
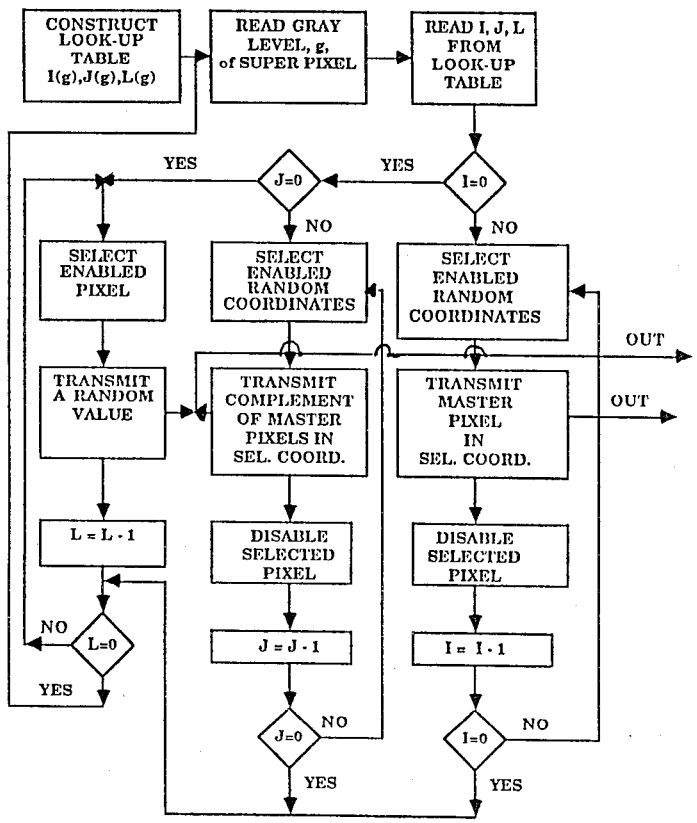
FIG. 10 is a flow diagram illustrating the manner of encryption according to the "superpixel" variation.

The image is encrypted by a system according to the block diagram illustrated in FIG. 9, and according to the flow diagram of FIG. 10.

Thus, a processor 100 is supplied with information concerning the master image from a master frame store 102, and is also supplied with the image information by scanning the image at 104, digitizing it by digitizer 106, and storing it in the image frame store 108. Processor 100 is also provided with a look-up table 110 which outputs signals to processor 100 in accordance with the one of nine possible grey levels of the corresponding superpixel. These signals are used by the processor for encoding the image before transmitting the encoded image via transmitter 112.

Following is one example of such a look-up table for the case of superpixels including $2 \times 2$ pixels (nine possible grey levels).

TABLE 1

| g meaning grey level (transmittance) | Symbol | | |
|---|---|---|---|
| | I No. of copied pixels from Master | J No. of complement from Master | L No. of random pixels |
| 0 (0) | 0 | 4 | 0 |
| 1 (1/16) | 0 | 3 | 1 |
| 2 (⅛) | 0 | 2 | 2 |
| 3 (3/16) | 0 | 1 | 3 |
| 4 (¼) | 0 | 0 | 4 |
| 5 (5/16) | 1 | 0 | 3 |
| 6 (⅜) | 2 | 0 | 2 |
| 7 (7/16) | 3 | 0 | 1 |
| 8 (½) | 4 | 0 | 0 |

With reference to the flow diagram of FIG. 10, the first step is the construction of a look-up table which gives three outputs: (1) the number (I) of pixels to be copied from the master; (2) the number (J) of pixels to be complemented and; (3) the number (L) of pixels to be chosen at random. The sum of I, J, and L is equal to the number "M" of pixels in the superpixel array. The input "g" to the look-up table is one of 2M+1 grey levels; where a superpixel includes 4 pixels (2×2) as in our case, three are 9 grey levels of the image being coded.

The superpixels are scanned in a normal sequence. For each superpixel, the grey level(g) is determined and the corresponding I, J, and L values are read from the look-up table. If I is positive (J=0), the processor follows the sequence in the rightmost column in the flowcharts. The coordinates of the first pixel to be transmitted are selected at random. In future iterations, only enabled coordinates, namely those which have not been transmitted yet, may be selected. The value of the master grid at the selected coordinates is transmitted, and the corresponding pixel in the image is disabled to prevent it from being selected again. This sequence is repeated I times.

If J is positive (I=0), the sequence of the middle column is carried out. No pixel is duplicated. Instead, J pixels will be transmitted with values equal to the complement of the pixel value in the corresponding coordinates of the master grid.

When either of the above sequences has been completed, control is passed to the leftmost column in the chart, where pixel values are chosen at random. The pixel coordinates are scanned in a regular fashion (not random), and those pixel which have not been disabled in previous steps are assigned random values and transmitted. If either I or J is equal to M, namely L=0, this section is bypassed, and control is transferred to the next superpixel in the image.

When L=M, namely both I and J equal 0, both rightmost and middle column are bypassed, and the entire pixel array is transmitted in a random fashion through the left column of the chart.

Several additional methods can be used to make unauthorized deciphering even more difficult. The coordinates of the superpixels can be scrambled, with the unscrambling done by the computer after combining the encoded grid with the master. The master grid can be a physical grid, or a numerical grid stored in the computer's memory. Alternatively, a simpler scrambling mechanism would be to vary the origin of the coordinate axes so that it corresponds to an arbitrary point in the master. The two grids are thus cyclically shifted relative to one another. The information on the correct origin is sent together with the encoded grid. A variation of this technique would be to use various masters, with the identity of the master encoded together with the picture. These and other methods may be necessary to reduce the correlation between different encoded grids, in case someone tries to decipher the code by combining them.

In addition, random grids can be employed as transparencies with a range of transmissions chosen at random, instead of "0" and "1" as described above; the combined transmission of the master and encoded grids is the picture. Further, instead of black and white, color can also be employed.

The method can be implemented in various forms. For instance, the encoded picture can be printed on an identification card and the master stored in the computer's memory. During decoding, the computer would combine the stored master with the video frame of the card, and do the necessary contrast enhancement operations. The use of a computer for processing the image may have additional benefits, such as filtering out random noise with some well known noise reduction algorithm.

While the invention has been described with respect to several preferred embodiments, it will be appreciated that many other variations, modifications and applications of the invention may be made.

What is claimed is:

1. A method of encoding an optical image comprising:
   converting the optical image to an image grid comprised of an image matrix of pixels each having at least two possible intensity values;
   providing a master grid comprised of a master matrix of pixels each having at least two possible intensity values;
   and transmitting, for each pixel location of the image matrix, a pixel intensity value representing the intensity value of the master matrix at the corresponding location, its complement, or a random intensity value, depending on the intensity value of the pixel in the image matrix at the corresponding location.

2. The method according to claim 1, wherein the master grid is stored in a memorydevice.

3. The method according to claim 1, wherein the master pixel intensity value is transmitted when the image pixel is of one intensity value, and the complement of the master pixel intensity value is transmitted when the image pixel is of the other intensity value.

4. The method according to claim 1, wherein the master pixel intensity value is transmitted when the image pixel is of one intensity value, and a random intensity value is transmitted when the master pixel is of the other intensity value.

5. The method according to claim 1, wherein a random intensity value is transmitted when the image pixel is of one intensity value, and the complement of the master pixel intensity value is transmitted when the image pixel is of the other intensity value.

6. The method according to claim 1, wherein each pixel has at least three possible intensity values, the master pixel intensity value being transmitted when the image pixel is of one intensity value, a random intensity value being transmitted when the pixel is of the second intensity value, and the complement of the master pixel intensity value being transmitted when the image pixel is of the third intensity value.

7. The method according to claim 1, wherein said optical image is converted to an image matrix of pixels each having more than three pixel intensity values by grouping a plurality of pixels into groups of superpixels having a number of grey levels increasing with the number of pixels in the superpixel.

8. A method of encrypting an optical image, comprising:
   transmitting the encoded optical image in accordance with claim 1;
   receiving said encoded optical image;
   and decoding said encoded optical image by combining each pixel of the received matrix with each pixel of said master matrix.

9. The method according to claim 8, wherein the master grid, during the decoding, is stored in a memory.

10. The method according to claim 8, wherein the master grid, during the decoding, is in the form of a transparency combined with the encoded image matrix.

11. Apparatus for encoding an optical image comprising:
- means for converting the optical image to an image grid comprised of an image matrix of pixels each having at least two possible intensity values;
- means for storing a master grid comprised of a master matrix of pixels each having at least two possible intensity values;
- and means for transmitting, for each pixel location of the image matrix, a pixel intensity value representing the intensity value of the master matrix at the corresponding location, its complement, or a random intensity value, depending on the intensity value of the pixel in the image matrix at the corresponding location.

12. Apparatus according to claim 11, wherein said latter means transmits the master pixel intensity value when the image pixel is of one intensity value, and the complement of the master pixel intensity value when the image pixel is of the other intensity value.

13. Apparatus according to claim 11, wherein said latter means transmits the master pixel intensity value when the image pixel is of one intensity value, and a random intensity value is transmitted when the master pixel is of the other intensity value.

14. Apparatus according to claim 11, wherein said latter means transmits a random intensity value when the image pixel is of one intensity value, and the complement of the master pixel intensity value when the image pixel is of the other intensity value.

15. Apparatus according to claim 11, wherein each pixel has at least three possible intensity values, said latter means transmitting the master pixel intensity value when the image pixel is of one intensity value, a random intensity value when the pixel is of the second intensity value, and the complement of the master pixel intensity value when the image pixel is of the third intensity value.

16. Apparatus according to claim 11, wherein said latter means groups the pixels into groups, each constituting a superpixel, which superpixel has a grey level varying according to the number of pixels in each group, to thereby convert the optical image to an image matrix of superpixels each having more than three intensity values.

17. Apparatus for encrypting an optical image, comprising:
- means for transmitting the encoded optical image in accordance with claim 11;
- means for receiving said encoded optical image;
- and means for decoding said encoded optical image by combining each pixel of the received matrix with each pixel of said master matrix.

18. Apparatus according to claim 17, wherein the master grid, during the decoding, is stored in a memory.

19. Apparatus according to claim 17, wherein the master grid, during the decoding, is in the form of a transparency combined with the encoded image matrix.

* * * * *